March 24, 1931. E. GENTIL 1,797,649
TAKE-OFF AND LEERING CONVEYER FOR SHEET GLASS FORMING MACHINES
Filed Aug. 6, 1928
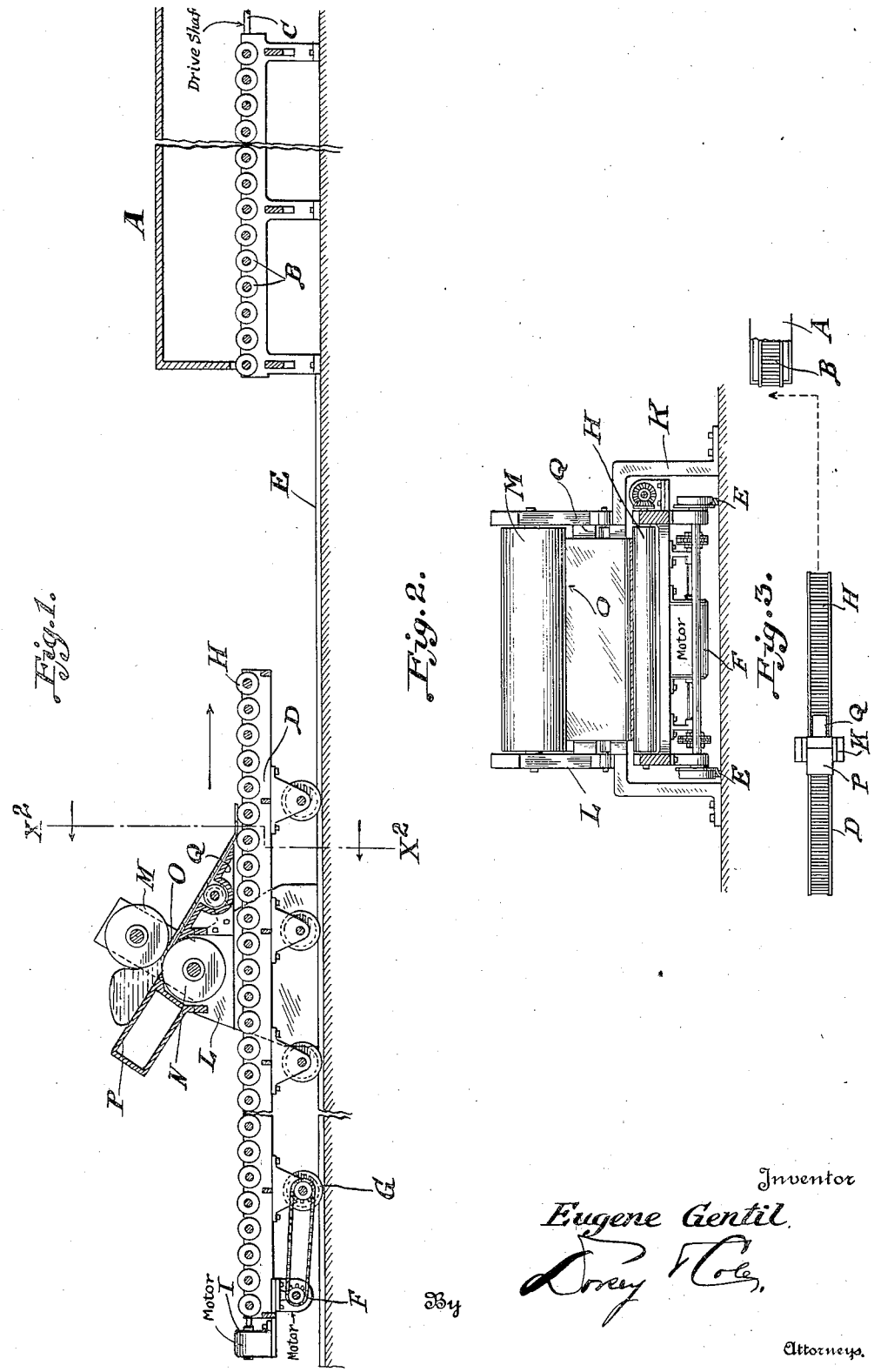
Inventor
Eugene Gentil.
By
Attorneys.

Patented Mar. 24, 1931

1,797,649

REISSUED

UNITED STATES PATENT OFFICE

EUGENE GENTIL, OF PARIS, FRANCE, ASSIGNOR TO THE AMERICAN BICHEROUX COMPANY, A CORPORATION OF DELAWARE

TAKE-OFF AND LEERING CONVEYER FOR SHEET-GLASS-FORMING MACHINES

Application filed August 6, 1928, Serial No. 297,715, and in Germany April 7, 1928.

In the leering of glass sheets formed by the so-called intermittent process, such for instance as the Bicheroux process, certain difficulties arise from the fact that the speed at which the sheet is formed is much higher than the speed at which it is desirable to feed the sheet through the leer. Various schemes have been proposed to effect a slowing down of the travel of the sheet from the speed at which it is taken from the forming pass to the speed at which it is to move through the leer. Many of these involve the use of a conveying bed formed of a series of rolls on which the glass is supported and by the rotation of which the glass is fed, with means for changing the speed of rotation of a group of contiguous rollers from that corresponding to the high speed of sheet formation to the speed of leering, and driving the rollers in advance of the change speed rollers at high speed and those behind at low speed. This necessitates the use of a variable speed drive for the group of variable speed rollers, and has numerous disadvantages. I propose to accomplish the necessary change in speed of the sheet, not by changing the speed of rotation of the sheet carrying rollers, but by bodily moving a group of rollers rotated at leering speed and on which the glass is supported in the direction of the feed of the sheet at a speed equal to the difference between the speed of sheet formation and the leering speed. By preference, the movable rollers are arranged to receive the sheet from the forming machine while moving as a whole at the desired speed, and at the termination of such forward movement are adjacent to and in alignment with the leer, into which the sheet will be delivered by the rotation of the rollers.

For these purposes my invention consists in the construction, arrangement, and combination of parts as will be hereinafter described and claimed.

Referring to the accompanying drawings in which corresponding parts are designated by corresponding marks of reference,—

Figure 1 is a diagrammatic section through an apparatus embodying my invention.

Figure 2 is a transverse section on line $X^2$—$X^2$ thereof.

Figure 3 is a diagrammatic plan showing an arrangement in which the sheet forming mechanism is not in alignment with the axis of the leer, but is to one side thereof, and in which the take-off carriage moves not only in the direction of the axis of the leer, but at right angles thereto.

A represents a leer of any approved type having a conveyer therein for the sheets, this being in the form shown, constituted by a series of rollers B driven by the longitudinal drive shaft at peripheral speeds to feed the sheet through the leer at the desired low speed.

In front of the leer and in alignment therewith (Fig. 1) the take-off carriage D is movable on track E by a motor F geared to wheels G of the carriage. The glass-receiving bed of the carriage has a movement in respect to the carriage itself, the speed of such rotative movement being the same as the leering speed. In the structure shown the glass-receiving surface of the carriage is formed by rollers H driven from the motor I.

Mounted on a frame K straddling the carriage is the sheet forming machine L. As shown this is of the Bicheroux type, and comprises the rolls M and N, having a forming pass O between them, and having a receiver P in advance of the rolls. It also has an apron Q, down which the sheet formed at the pass slides, and by which it is delivered to the glass-receiving surface of the carriage which passes under it.

With this construction of parts, the carriage with its rolls H in rotation, is moved under the forming machine towards the leer, as represented by the arrow,—the speed of carriage movement being such that by such movement and the rotation of the rollers H, the sheet will be removed from the forming machine at the rate it is formed, or if preferred, at a slightly higher rate, which is permitted by the plasticity of the sheet. The continued movement of the carriage brings it against the front of the leer and in registration with the leer conveyer formed by the rollers B, before the head of the sheet has been brought by the rotation of the rollers H, to the forward end of the carriage. The continued rotation of the rollers H then feed the sheet onto the rollers C of the leer conveyer, and when such delivery has been completed, the carriage may be run back to its initial position under the forming machine to receive a new sheet.

In so far as concerns the broader aspect of my invention, the carriage may, after receiving the sheet be moved in any direction to bring it into alignment with the leer during the time the sheet is being delivered from it to the leer. Thus, as shown in Figure 3, the forming machine and the carriage when receiving the sheet may be to one side of the axis of the leer, and be brought by a lateral movement into alignment with the leer after the sheet has been fully formed. The path described by the forward end of the carriage under such an arrangement is represented by the dotted direction line in Figure 3. This arrangement is desirable in that it permits the leer to be fed by two carriages and thus permits a closer distribution of sheets in the leer conveyer than would otherwise be possible.

Having thus described my invention what I claim and desire to secure by Letters Patent is,—

1. The combination with a sheet glass-forming machine, of a take-off carriage therefor having a glass-receiving surface movable in respect to the carriage, and means for moving, in the direction of sheet delivery, the receiving surface of the carriage, and the carriage, in respect to the forming machine and for moving in the direction of sheet delivery the receiving surface of the carriage in respect to the carriage.

2. The combination with a sheet glass-forming machine, of a take-off carriage therefor having a glass-receiving surface movable in respect to the carriage, and means for moving, in the direction of sheet delivery, the receiving surface of the carriage in respect to the carriage, and the carriage in respect to the forming machine, the sum of the speeds of such movements being substantially equal to the speed of sheet formation.

3. The combination with a sheet glass-forming machine, of a take-off carriage therefor having a glass-receiving surface movable in respect to the carriage, such surface being formed of a series of rollers, means for rotating the rollers, and means for moving the carriage in the direction of sheet formation and in respect to the forming machine.

4. The combination with a sheet glass-forming machine, of a take-off carriage therefor having a glass-receiving surface comprising driven rollers rotating during the reception of a sheet, means for moving, in the direction of sheet delivery, the receiving surface of the carriage and the carriage in respect to the forming machine, the sum of the peripheral speed of the rollers and the speed of movement of the carriage during sheet formation being substantially equal to the speed of sheet formation.

5. The combination with a sheet glass-forming machine, of a leer-conveyer having a conveying speed less than of sheet formation, a take-off carriage for the forming machine having a sheet-receiving surface movable in respect to the carriage, means for moving, in the direction of sheet delivery and during sheet delivery, the receiving surface in respect to the carriage at leering speed, and for moving the carriage towards the leer conveyer.

6. The combination with a sheet glass-forming machine, of a leer-conveyer having a conveying speed less than of sheet formation, a take-off carriage for the forming machine having a sheet-receiving surface movable in respect to the carriage, means for moving at leering speed in the direction of sheet formation the receiving surface in respect to the carriage, and for moving the carriage towards the leer, the sum of the speeds of such movements being substantially equal to the speed of sheet formation.

7. The combination with a sheet glass-forming machine, of a leer conveyer having a conveying speed less than that of sheet formation, a take-off carriage for the forming machine having a series of glass-receiving rollers thereon, means for rotating the rollers at leering speed, and means for moving the carriage in the direction of sheet delivery, and for bringing it into co-operative relation with the leer conveyer.

8. The combination with a sheet glass-forming machine, of a leer conveyer having a conveying speed less than that of sheet formation, a take-off carriage for the forming machine having a series of glass-receiving rollers thereon, means for rotating the rollers at leering speed, and means for moving the carriage in the direction of sheet delivery, and for bringing it into co-operative relation with the leer conveyer, the sum of the peripheral speed of the rollers and the speed of movement of the carriage during sheet formation being substantially equal to the speed of sheet formation.

9. The combination with a sheet glass forming machine of a take-off carriage therefor having a glass receiving surface movable in respect to the carriage and means for moving both the receiving surface of the carriage and the carriage in respect to the forming machine and for moving in the direction of sheet delivery the receiving surface of the carriage in respect to the carriage.

EUGENE GENTIL.